(12) United States Patent  (10) Patent No.: US 7,516,828 B2
Kitada  (45) Date of Patent: Apr. 14, 2009

(54) CLUTCH DISC (75) Inventor: Koji Kitada, Chiryu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 219 days.

(21) Appl. No.: 11/274,088

(22) Filed: Nov. 16, 2005

(65) Prior Publication Data
US 2006/0102444 A1 May 18, 2006

(30) Foreign Application Priority Data
Nov. 17, 2004 (JP) ............................. 2004-333753

(51) Int. Cl.
F16D 3/14 (2006.01)
(52) U.S. Cl. .................... 192/213.12; 192/213.31
(58) Field of Classification Search ............... 192/204, 192/213.22, 214.1, 213.12, 213.31, 70.17, 192/210.1
See application file for complete search history.

(56) References Cited

U.S. PATENT DOCUMENTS

| 5,014,842 | A | * | 5/1991 | Graton et al. | ............... | 192/204 |
| 5,240,458 | A | * | 8/1993 | Linglain et al. | ............ | 464/67.1 |
| 5,820,466 | A | | 10/1998 | Graton et al. | | |
| 5,899,812 | A | | 5/1999 | Nagano et al. | | |
| 6,083,107 | A | * | 7/2000 | Herbst | ........................ | 464/64.1 |
| 6,179,715 | B1 | | 1/2001 | Graton et al. | | |
| 2004/0185941 | A1 | | 9/2004 | Uchara | | |

FOREIGN PATENT DOCUMENTS

| JP | 7-54921 | 2/1995 |
| JP | 09-112569 | 5/1997 |
| JP | 10-103407 | 4/1998 |

OTHER PUBLICATIONS

Chinese Patent Office Action dated Oct. 17, 2008 in Application No. 200510125496.6 with English Translation.

* cited by examiner

Primary Examiner—Charles A. Marmor
Assistant Examiner—Derek D Knight
(74) Attorney, Agent, or Firm—Buchanan Ingersoll & Rooney PC (57) ABSTRACT A clutch disc includes a hub having a flange portion extended in a radial direction and a boss portion connected to a driven shaft, a side plate arranged coaxially with and relatively rotatable with the hub, a friction member connected to an external periphery of the side plate and frictionally engaged with a drive shaft, an accommodation window formed on an external periphery portion of the hub and on the side plate, the accommodation window on the hub and the accommodation window on the side plate being positioned facing each other, springs elastically connecting the hub to the side plate in the accommodation window, and a thrust member provided in a space between the hub and the side plate. The thrust member includes a ring shape member biased towards the flange portion of the hub by a biasing device. An opposing surface configured to face the hub is tapered.

8 Claims, 6 Drawing Sheets

CLUTCH DISC

CROSS REFERENCE TO RELATED APPLICATIONS

This application is based on and claims priority under 35 U.S.C. §119 with respect to Japanese Patent Application No. 2004-333753 filed on Nov. 17, 2004, the entire content of which is incorporated herein by reference.

FIELD OF THE INVENTION

The present invention relates to a clutch disc which absorbs fluctuation of torque by means of a coil spring as it is transmitting torque. More particularly, the present invention pertains to a clutch disc which is provided with the properties of hysteresis by the provision of a thrust member between a hub and side plates.

BACKGROUND

Known mechanisms have been proposed for providing properties of hysteresis to a clutch disc for transmitting torque from an engine to a transmission on the basis of an elastic deformation of coil springs.

For example, JPH07-054291A describes a construction in which properties of hysteresis are generated by supporting and sandwiching a drive ring 40, which is engaged with a spring 90 within a closed ring 36, between friction rings 38, 39 at one side of a hub 13.

JPH09-112569A describes a hysteresis mechanism which securely causes sliding friction with a fiction plate 122, a mechanism in which projecting portions of a first friction member 120 and a second friction member 121 are engaged at both ends of a flange 105, and the first friction member 120 and the second friction member 121 are rotated unitarily with the flange 105.

JPH10-103407A describes a construction in which properties of hysteresis are generated in two steps by dividing a bush at one side into a first bush 16 and a second bush 18 and by causing friction between, on the one hand, the first bush 16 and a hub 2 and, on the other hand, the second bush and a separate flange 5.

Hysteresis mechanisms of clutch discs described in JPH09-112569A and JPH10-103407A are constructed on the presumption that opposing surfaces of a thrust member (e.g., a friction member, or a bush) and a friction surface of a hub (e.g., a friction plate, or a separate flange) make contact uniformly at plane surfaces, generate frictional force, and generate properties of hysteresis.

The thrust member is most often formed by injection molding with resin in order to reduce manufacturing costs and weight, and an opposing surface of the thrust member may also in these circumstances be formed by injection molding. In these circumstances, the opposing surface is not necessarily formed uniformly, either because of cooling contracture during injection molding, which becomes the cause of dispersion during manufacturing, or because of uneven dents caused by the configuration of the thrust member. Surface waviness and warping may thus on occasions be generated at the opposing surface.

In other words, when the thrust member having surface waviness and warping on the opposing surface is applied to a hysteresis mechanism of a clutch disc described in JPH07-54921, JPH09-112569, or JPH10-103407, the opposing surface of the thrust member does not make contact uniformly with the frictional surface of the hub (e.g., the friction plate or separate flange). Properties of hysteresis are accordingly dispersed when the clutch disc is initially assembled and thus there has been a danger of the properties of hysteresis not being able to perform an adequate level of torsion cushioning performance of the clutch disc.

SUMMARY OF THE INVENTION

In light of the foregoing, the present invention provides a clutch disc, which includes a hub having a flange portion extended in a radial direction and a boss portion connected to a driven shaft, a side plate arranged coaxially with and relatively rotatable with the hub, a friction member connected to an external periphery of the side plate and frictionally engaged with a drive shaft, an accommodation window formed on an external periphery portion of the hub and on the side plate, the accommodation window on the hub and the accommodation window on the side plate being positioned facing each other in a rotational axial direction, a plurality of springs elastically connecting the hub to the side plate in a rotational direction in the accommodation window, and a thrust member provided in a space in an axial direction between the hub and the side plate. The thrust member includes a ring shape member which is biased towards the flange portion of the hub by a biasing means. An opposing surface configured to face the hub is tapered.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawing figures as follows.

Figure 1:
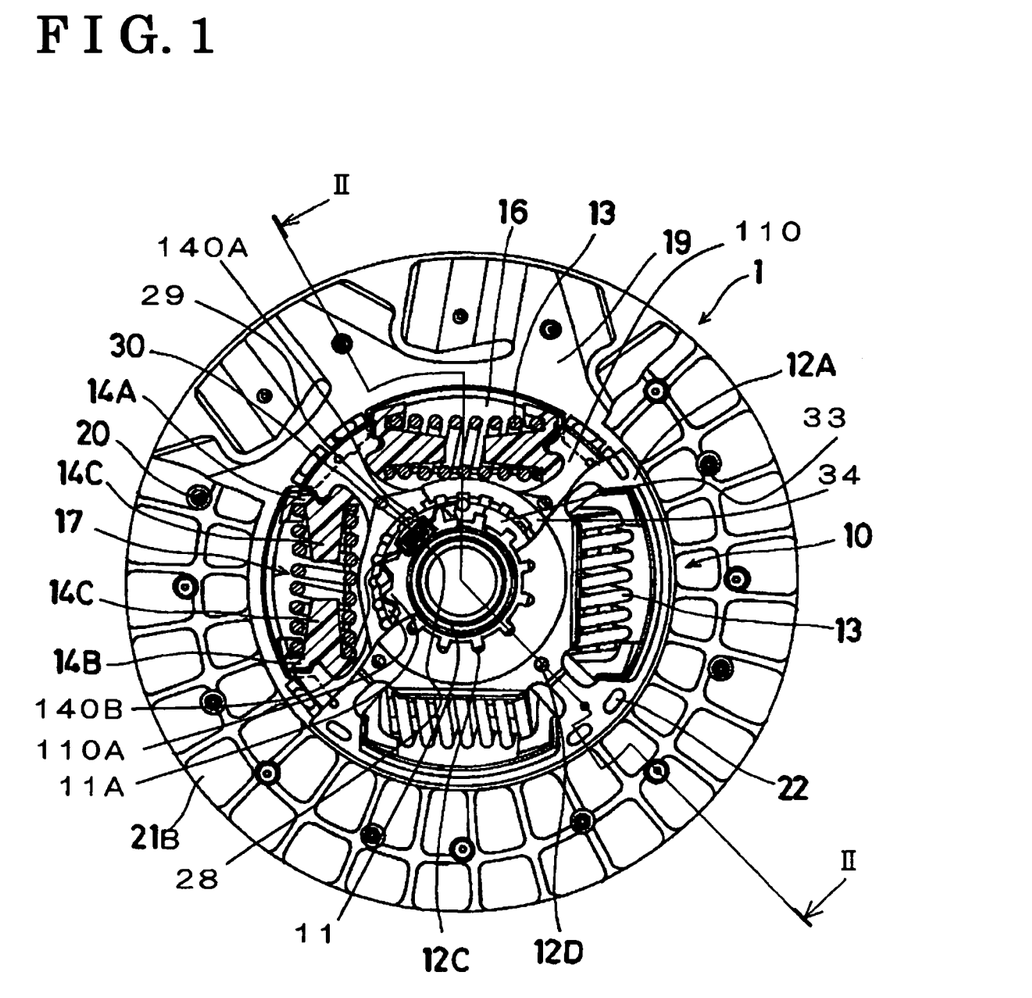
FIG. 1 is a partial front view of a clutch disc according to a first embodiment of the present invention.
Figure 2:
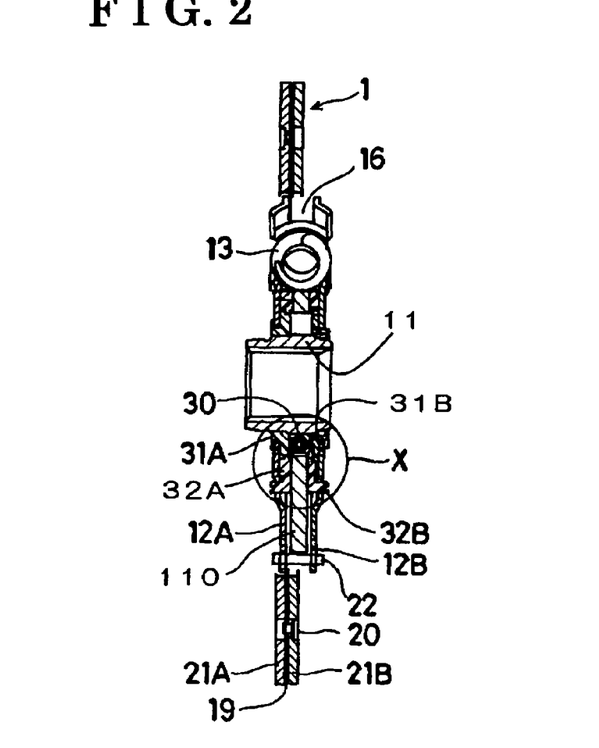
FIG. 2 is a cross-sectional view of the clutch disc taken on line II-II of FIG. 1 according to the first embodiment of the present invention.

A clutch disc 1 includes an inner hub 11 which is engaged by means of splines with an input shaft of a transmission of a driven shaft of an outer hub 110, the outer hub 110 which is configured in a ring shape and coaxially positioned at an outer periphery of the inner hub 11, four sub-coil springs 30 for elastically connecting the inner hub 11 to the outer hub 110 in a peripheral direction, a pair of sub-spring sheets 140A, 140B for supporting each of the sub-coil springs 30 relative to the inner hub 11 and the outer hub 110, a first side plate 12A which is co-axially arranged at a first side of the inner hub 11 and a first side of the outer hub 110, and a second side plate 12B which is co-axially arranged at a second side of the inner hub 11 and a second side of the outer hub 110 in such a way that the first side plate 12A and the second side plate 12b are both relatively rotatable with the inner hub 11 and the outer hub 110, four coil springs 13 (i.e., serving as a spring) for elastically connecting the outer hub 110 to the first and second side plates 12A, 12B in a peripheral direction, a pair of springs 14A, 14B for supporting each of the coil springs 13 relative to the outer hub 110 and to the first and second side plates 12A, 12B, a first inner thrust member 31A and a first outer thrust member 32A (i.e., serving as a thrust member) which are both positioned between, on the one hand, the first side plate 12A, and, on the other hand, the inner hub 11 and the outer hub 110, a second inner thrust member 31B and a second outer thrust member 32B (i.e., serving as a thrust member) which are both positioned between, on the one hand, the second side plate 12B, and, on the other hand, the inner hub 11 and the outer hub 110, an inner coned disc spring 33 for biasing the second inner thrust member 31B towards the inner hub 11, and an outer coned disc spring 34 for biasing the second outer thrust member 32B towards the outer hub 110.

The first side plate 12A and the second side plate 12B are fixed by means of rivets 22 at an external periphery in a radial direction of the outer hub 110 keeping a predetermined distance from each other, and thus the first side plate 12A and the second side plate 12B integrally rotate. A cushioning plate 19 which is configured to have a ring shape having waviness on surface thereof in a thickness direction is fixed on an external periphery portion of the first side plate 12A. Friction members 21A, 21B are fixed on first and second surfaces of the cushioning plate 19 respectively by means of the rivets 20. The friction members 21A, 21B are positioned between a flywheel fixed on a crankshaft of an engine and a pressure plate of a clutch cover fixed to the flywheel by means of bolts. Because the friction members 21A, 21B are pushed onto the pressure plate so as to frictionally engage with the flywheel with the pressure plate, rotational torque of the engine is inputted into the first side plate 12A.

The coil springs 13 are arranged in accommodation windows 16 provided on the first side plate 12A and the second side plate 12B. The accommodation window 16 is a recess formed on the outer hub 110 by recessing an external periphery portion of the outer hub 110 in a radial outward direction. External periphery surface side of the sheet portion of the spring sheets 14A, 14B is positioned at outside in a radial direction compared to the external periphery surface of the outer hub 110. Accordingly, the coil springs 13 can be positioned at as external periphery side as possible, a size of the coil springs 13 applied to the clutch disc can be increased, and the clutch disc can cope with larger degree of torque fluctuation. Accommodation windows 17 formed on the first side plate 12A and the second side plate 12B are window bores formed by punching at an external periphery side relative to the coil springs 13, and are provided at positions opposing each of the accommodation windows 16 of the outer hub 110 relative to a rotational axis. Each coil spring 13, while being supported by a pair of the spring sheets 14A, 14B, is accommodated in the accommodation windows 16, 17 formed with the first side plate 12A, the second side plate 12B, and the outer hub 110. The accommodation window 17 formed on the side plates 12A, 12B is formed in semi-chambered configuration by punching, and pinches and supports the spring sheets 14A, 14B by covering both ends of the sheet portion of the spring sheets 14A, 14B. A concave portion is formed at a central portion of the sheet portion of the spring sheets 14A, 14B and a convex portion formed on the outer hub 110 is fitted into the concave portion, and thus the spring sheets 14A, 14B are pinched and supported by the outer hub 110. In other words, the coil springs 13 are supported by the side plates 12A, 12B and the outer hub 110 through the spring sheets 14A, 14B. Upon a rotation of the side plates 12A, 12B the coil springs 13 are deformed, and restoring force of the coil springs 13 rotates the side plates 12A, 12B.

A projecting portion 14C, projecting towards opposing spring sheet 14A or 14B in the accommodation windows 16, 17, is integrally formed on each of the spring sheet 14A, 14B. The projecting portions 14C formed on the spring sheets 14A, 14B are configured not to allow further relative rotation upon a timing when ends of the projecting portions 14C contact each other by the relative rotation between, on the one hand, the first side plate 12A and the second side plate 12B, and, on the other hand, the outer hub 110 (i.e., a timing when a relative rotation angle reaches a predetermined angle $\theta 1$ from zero). In other words, by contacting projecting portions 14C, 14C each other when the relative rotation angle reaches the predetermined angle $\theta 1$, relative rotation between, on the one hand, the outer hub 110 and, on the other hand, the first side plate 12A and the second side plate 12B is allowed only within a predetermined angle $\theta 1$, and relative rotation equal to or greater than the predetermined angle $\theta 1$ is not allowed.

Configuration of the projecting portion 14C will be further explained as follows. The end of the projecting portion 14C includes a plane shape, and tapered to be smaller as closer to the end of the projecting portion 14C. When the relative rotation angle reaches a predetermined angle $\theta 1$, the planes of the ends of the projecting portions 14C, 14C come to be arranged in parallel to each other, and an axial center of the projecting portions 14C, 14C come to be arranged on an identical line. The projecting portions 14C, 14C which are arranged opposing each other have the identical configurations, and the spring sheets 14A, 14B arranged opposing each other have the identical configuration.

The sub-coil springs 30 are arranged in space formed by recess portions 28, 29 provided on the outer hub 110 and the inner hub 11. The recess portion 28, formed on the inner hub 11 including a flange portion and a boss portion engaged by means of splines with an input shaft of a transmission of a driven shaft, is formed by recessing an external periphery of the flange portion of the inner hub 11. The recess portion 29 is formed on the outer hub 110 by recessing an internal periphery portion of the outer hub 110 which is shaped in a ring, and the recess portion 29 is formed at a position which opposes to the recess portion 28 in a radial direction. Each of the sub-coil springs 30 is supported by a pair of the sub-spring sheets 140A, 140B, and a half of the sheet portion of the sub-spring sheet 140A is engaged with the recess portion 28 in a circumferential direction and a half of the sheet portion of the sub-spring sheet 140B is engaged with the recess portion 29 in a circumferential direction. When the outer hub 110 rotates relative to the inner hub 11, the sub-coil springs 30 are compressed, and the inner hub 11 is rotated by the restoring force of the sub-coil springs 30. Accordingly, torque transmitted to the side plates 12A, 12B is transmitted to the inner hub 11 through the outer hub 110.

Projections 11A projecting to an external peripheral side are formed on the inner hub 11, and projections 110A projecting to an internal peripheral side are formed on the outer hub 110. Upon a timing that the outer hub 110 rotates relative to the inner hub 11 by a predetermined angle θ2 (i.e., a timing when the relative rotation between the outer hub 110 and the inner hub reaches a predetermined angle θ2 from zero), the projections 11A and the projections 110A contact to restrict the relative rotation of the inner hub 11 and the outer hub 110.

As explained above, the inner hub 11 and the outer hub 110 are elastically connected in a rotational direction through the sub-coil springs 30, and the outer hub 110 and the side plates 12A, 12B are elastically connected in a rotational direction through the coil springs 13, and thus the inner hub 11 and the outer hub 110 can rotate relative to each other and the outer hub 110 and the side plates 12A, 12B can rotate relative to each other. Spring constant of the coil springs 13 is set several times greater than spring constant of the sub-coil springs 30. When torque from an engine is inputted to the first side plate 12A by means of the frictional engagement between the friction members 21A, 21B, the coil springs 13 is not elastically deformed immediately after the input of the torque because the spring constant of the coil springs 13 is adequately greater than the spring constant of the sub-coil springs 130, and thus the outer hub 110 and the side plates 12A, 12B rotate integrally. By this integral rotation, the outer hub 110 rotates relative to the inner hub 11, the sub-coil springs 30 is elastically deformed, and the torque is transmitted to the input shaft of the transmission through the inner hub 11. When the relative rotation between the outer hub 110 and the inner hub 11 reaches the predetermined angle θ2, the projections 110A and the projections 11A contact one another so that the outer hub 110 and the inner hub 11 rotate integrally, the coil springs 13 starts elastically deforming, and the side plates 12A, 12B starts rotating relative to the outer hub 110. Upon further greater torque being inputted, the relative rotation between the outer hub 110 and the first and second side plates 12A, 12B reaches the predetermine angle θ1, and the side plates 12A, 12B, the outer hub 110, and the inner hub 11 rotate integrally, and thus torque of the engine is directly transmitted to the input shaft of the transmission.

With the construction of a relative rotational mechanism with two steps explained above, the clutch disc 1 according to the embodiment of the present invention absorbs smaller degree of torque fluctuation caused, for example, by combustion of the engine with the sub-coil springs 30 having smaller spring constant, and absorbs greater degree of torque fluctuation caused, for example, by ON-OFF of an acceleration or at a shift change of the vehicle with the coil springs 13 having greater spring constant, thus the torque fluctuation can be effectively absorbed.

Figure 3:
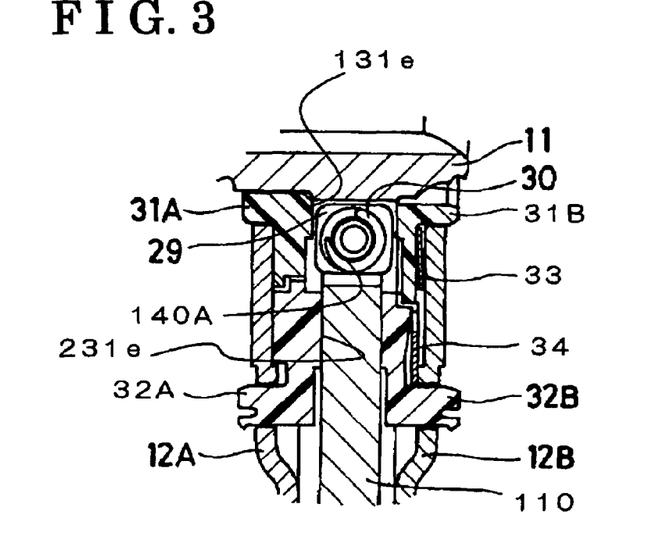
FIG. 3 is an enlarged cross-sectional view of a hysteresis mechanism of the clutch disc according to the first embodiment of the present invention.

Detailed construction of the hysteresis mechanism according to the present invention is explained with reference to FIGS. 3-5. As shown in FIG. 3, the hysteresis mechanism includes the outer hub 110, the inner hub 11, the outer thrust members 32A, 32B positioned at either side of the outer hub 110 and the inner hub 11, the inner thrust members 31A, 31B positioned at either side of the outer hub 110 and the inner hub 11, the outer coned disc spring 34 which biases the second outer thrust member 32B from the second side plate 12B to the outer hub 110 and the inner hub 11 side, and the inner coned disc spring 33 which biases the second inner thrust member 31B from the second side plate 12B to the outer hub 110 and the inner hub 11 side.

Figure 4A:
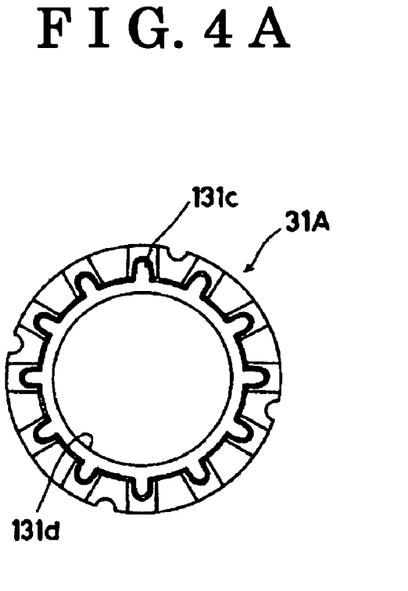
FIG. 4A is a front view of a first thrust member according to the present invention.
Figure 4B:
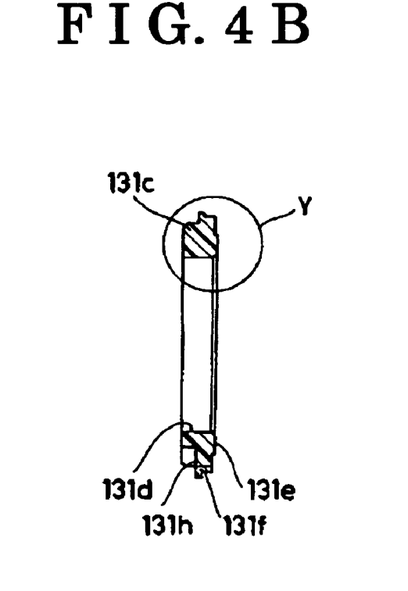
FIG. 4B is a cross-sectional view of the first thrust member according to the present invention.

As shown in FIG. 4A, plural detent portions 131c which project towards external peripheral direction in a radial direction are formed on a boss portion of an internal periphery of the first inner thrust member 31A. The detent portions 131c, as shown in FIG. 1, are fitted into plural detent grooves 12C respectively to be engaged therewith formed by recessing an internal periphery portion of the first side plate 12A. By the engagement between the detent portions 131c and the detent grooves 12C, the first side plate 12A and the first thrust member 31A rotate integrally. A boss portion of the inner hub 11 is inserted through an inner diameter portion 131d at an internal periphery of the first inner thrust member 31A, and the first inner thrust member 31A and the inner hub 11 coaxially positioned. An opposing surface 131e at an end surface of the first inner thrust member 31A contacts the flange portion of the inner hub 11. A contact surface 131h at backside of the opposing surface 131e contacts the first side plate 12A, and a guide portion 131f at an external peripheral side defines approximate position of the first outer thrust member 32A. The second inner thrust member 31B is provided at backside of the inner hub 11 relative to the side provided with the first inner thrust member 31A, and the inner hub 11 is sandwiched by the first inner thrust member 31A and the second inner thrust member 31B. The inner-coned disc spring 33 is provided between the second inner thrust member 31B and the second side plate 12B to biases the second inner thrust member 31B towards the inner hub 11. Because the first side plate 12A and the second side plate 12B are connected by means of the rivets 22, by the biasing force of the inner coned disc spring 33, a predetermined thrust force is generated between the inner hub 11 and the first and second inner thrust members 31A, 31B. Maximum static friction torque value TMIN and dynamic friction torque value TDIN in a rotational direction when the inner hub 11 and side plates 12A, 12B rotate relative to one another are determined on the basis of a relationship between thrust force by the inner coned disc spring 33 and a friction coefficient determined by relationship among the flange portion of the inner hub 11, the first and second thrust members 31A, 31B, and the opposing surface 131e.

When the absolute value of smaller degree of the torque fluctuation is less than the maximum static friction torque value TMIN when the smaller level of the torque fluctuation deriving from, for example, the combustion of the engine is inputted into the side plates 12A, 12B through the friction members 21A, 21B to be transmitted to the inner hub 11, the smaller level of torque fluctuation is directly transmitted to the input shaft of the transmission without causing slips in a rotational direction between the first and second inner thrust members 31A, 31B and the inner hub 11. In these circumstances, because the degree of the torque fluctuation is adequately small, oscillation and noise are unlikely generated in a vehicle.

When a torque fluctuation having greater level of absolute value than the maximum static friction torque TMAX is inputted, slips in a rotational direction is generated between the first and second inner thrust members 31A, 31B and the inner hub 11, a torque fluctuation between the first and second thrust members 31A, 31B and the inner hub 11 is absorbed by the clutch disc 1 by the elastic deformation of the sub-coil springs 30, and torque fluctuation transmitted into the input shaft of the transmission can be restrained.

Figure 5A:
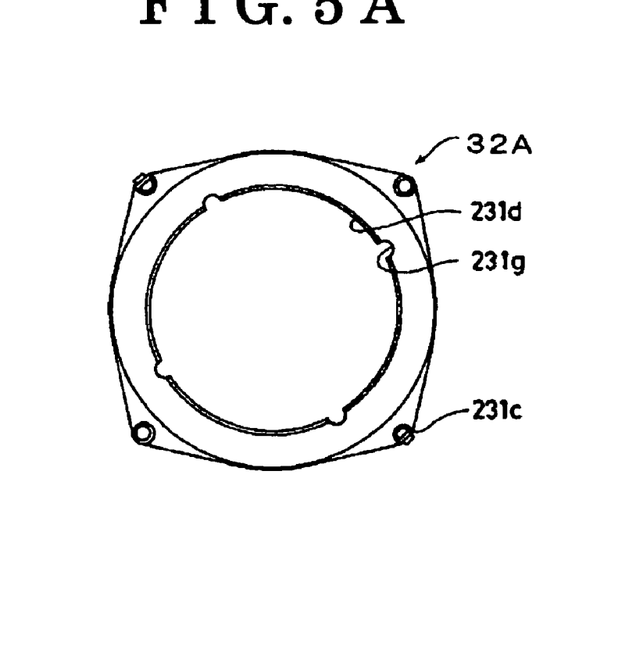
FIG. 5A is a front view of a second thrust member according to the present invention.
Figure 5B:
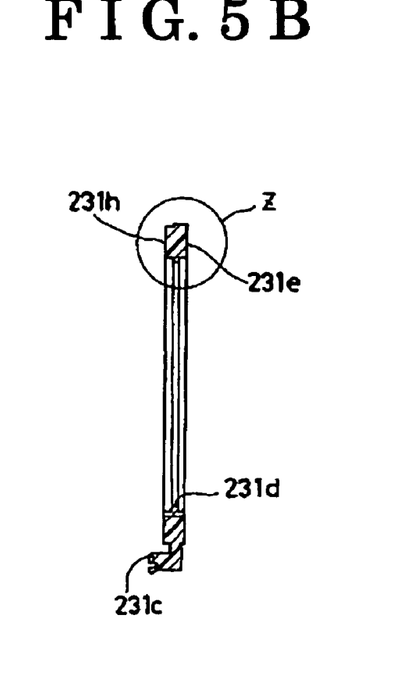
FIG. 5B is a cross-sectional view of the second thrust member according to the present invention.

As shown in FIG. 5A, plural detent portions 231c projecting to external peripheral side in a radial direction are formed on a boss portion at an internal periphery of the first outer thrust member 32A. As shown in FIG. 1, the detent portions 231c are configured to fit in plural detent bores 12D formed at an internal periphery of the first side plate 1, and the first outer thrust member 32A rotates integrally with the first side plate 12A. The first inner thrust member 31A is positioned at an inner diameter portion 231d of an internal periphery of the first outer thrust member 32A, the first outer thrust member 32A and the first inner thrust member 31A are coaxially arranged, and an opposing surface 231e of end surface of the first outer thrust member 32A contacts the outer hub 110. A contact surface 231h at backside of the opposing surface 231e contacts the first side plate 12A. The second outer thrust member 32B is arranged at the backside of the outer hub 110 relative to the first outer thrust member 32A, and the outer hub 110 is sandwiched by the first outer thrust member 32A and the second outer thrust member 32B. The outer-coned disc spring 34 is arranged between the second outer thrust member 32B and the second side plate 12B to biases the second outer thrust member 32B towards the outer hub 110. Because the first side plates 12A and the second side plate 12B are fastened by means of the rivets 22, a predetermined thrust force is generated between the outer hub 110 and the first and second outer thrust members 32A, 32B by the biasing force of the outer coned disc spring 34. A maximum static friction torque value TMOUT and dynamic friction torque value TDOUT in a rotational direction when the outer hub 110 and the side plates 12A, 12B rotate relative to one another is determined on the basis of the relationship between the thrust force by means of the outer coned disc spring 34 and the frictional coefficient determined on the basis of the mutual relationship among the flange portion of the outer hub 110, the first and second outer thrust members 32A, 32B, and the opposing surface 231e.

Greater level of torque fluctuation deriving, for example, from ON-OFF of a throttle pedal and at shift change of the vehicle is inputted into the sidle plates 12A, 12B through the friction members 21A, 21B. The torque is transmitted into the inner hub 11, the inner hub 11 and the outer hub 110 rotate relatively, the projections 11A and the projections 110A contact, and the inner hub 11 and the outer hub 110 starts integral rotation. When the absolute value of the greater level of the torque fluctuation is smaller than the maximum static friction torque value TMOUT, slips in a rotational direction is not generated between the first and second outer thrust members 32A, 32B and the outer hub 110, and the greater level of the torque fluctuation is transmitted into the input shaft to the transmission directly.

When the torque fluctuation with the greater absolute value than the maximum static friction torque TMOUT is inputted, slips in a rotational direction is generated between the first and second outer thrust members 32A, 32B and the outer hub 110, the torque fluctuation between the first and second outer thrust members 32A, 32B is absorbed by the clutch disc 1 by the elastic deformation of the coil springs 13, and the torque fluctuation transmitted to the input shaft of the transmission is restrained.

Figure 4C:
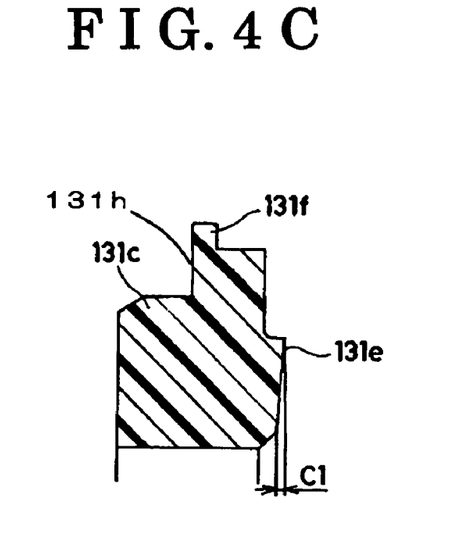
FIG. 4C is an enlarged partial cross-sectional view of the first thrust member according to the present invention.
Figure 5C:
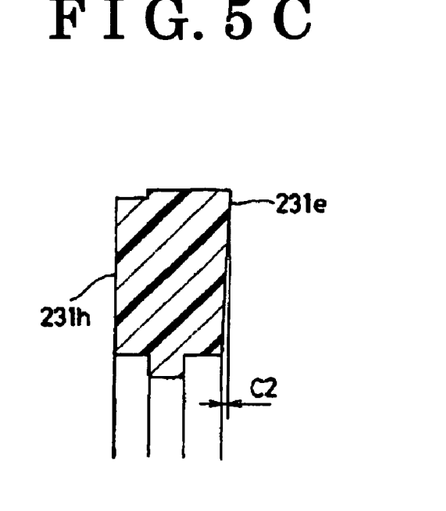
FIG. 5C is an enlarged partial cross-sectional view of the second thrust member according to the present invention.

Tapers C1, C2 are formed on the opposing surfaces 131e, 231e of the thrust members 31A, 31B, 32A, 32B facing the inner hub 11 and the outer hub 110 of the hysteresis mechanism, as shown in FIGS. 4C, 5C.

Degree of tapering of the taper C1 is defined by a difference between a thickness of an external periphery portion and a thickness of an internal periphery portion in an axial direction establishing an external periphery portion of the opposing surface 131e as a reference, and the taper C1 is formed in a direction so as not to contact the outer hub 110. With the foregoing construction, the external periphery portion of the opposing surface 131e contacts the flange portion of the inner hub 11. Because the external periphery portion contacts the flange portion of the inner hub 11 with a predetermined width in accordance with a thrust load of the inner coned disc spring 33, the pressure is increased, and the external periphery portion constantly contacts the flange portion of the inner hub 11 by deforming to reduce the influence of the surface waviness and the projections even when the surface waviness and the projections are appeared on the opposing surface 131e caused by the dispersion at manufacturing.

Degree of tapering of the taper C2 formed on the opposing surface 231e is defined by a difference between a thickness of the external periphery portion and a thickness of an internal periphery portion in an axial direction establishing the external periphery portion as a reference, and the taper 2 is formed in a direction so as not to contact the outer hub 110. With the foregoing construction, the external periphery portion of the opposing surface 231e contacts the outer hub 110. Because the external periphery portion of the opposing surface 231e contacts the outer hub 110 with a predetermined width corresponding to a thrust load of the outer coned disc spring 34, the pressure is increased, and thus the external periphery portion constantly contacts the outer hub 110 by deforming in order to reduce the influence even when projections and surface waviness are appeared on the opposing surface 231e because of dispersion during manufacturing.

With the foregoing configuration of tapers C1, C2, the thrust members 31A, 32A and the inner hub 11 and the outer hub 110 uniformly contact when initially assembled, and achieves stable hysterisis properties for generating the friction force. The degrees of tapering of the tapers C1 and C2 may be identical or not identical, and may be set in accordance with the hysteresis properties. Degree of tapering of tapers provided at the thrust members 31B, 32B positioned at symmetrical position of the thrust members 31A, 32A relative to the inner hub 11 and the outer hub 110 may be set arbitrarily for gaining desired hysteresis properties.

Figure 6:
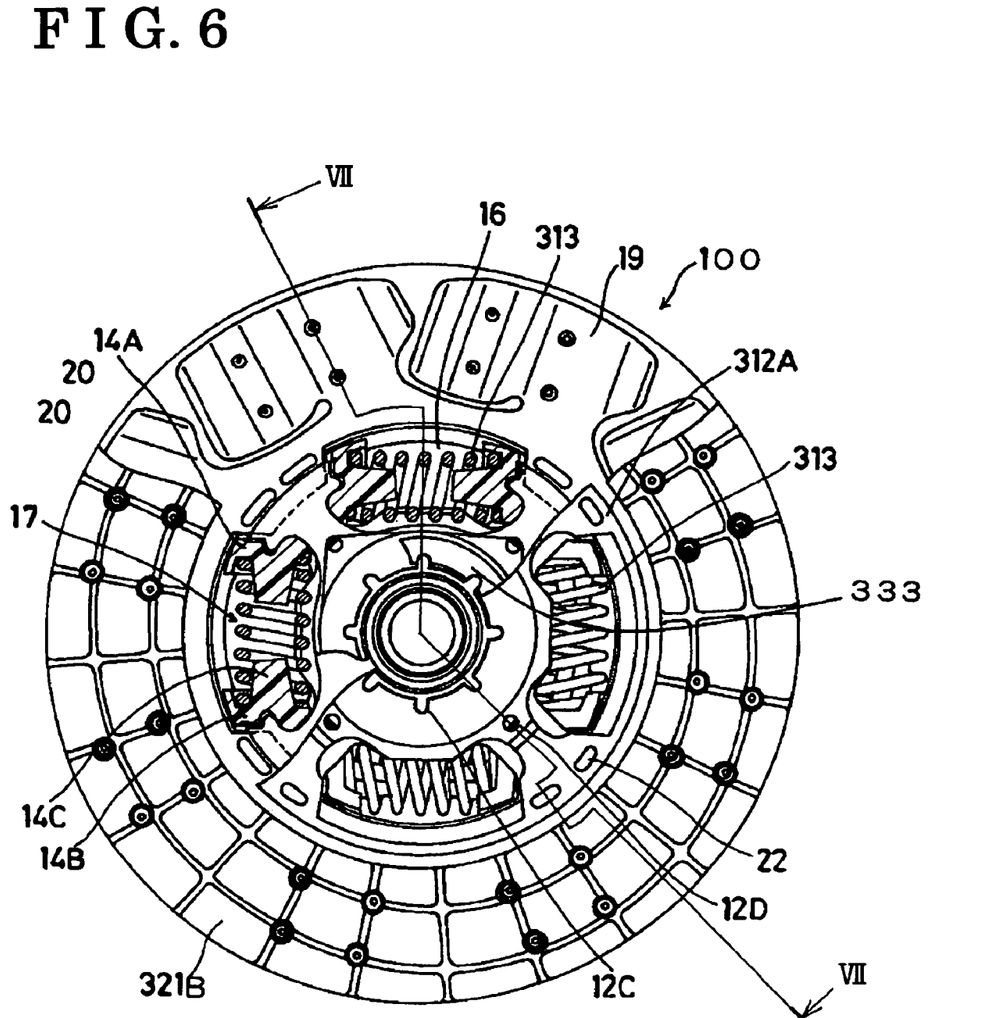
FIG. 6 is a partial front view of a clutch disc according to a second embodiment of the present invention.
Figure 7:
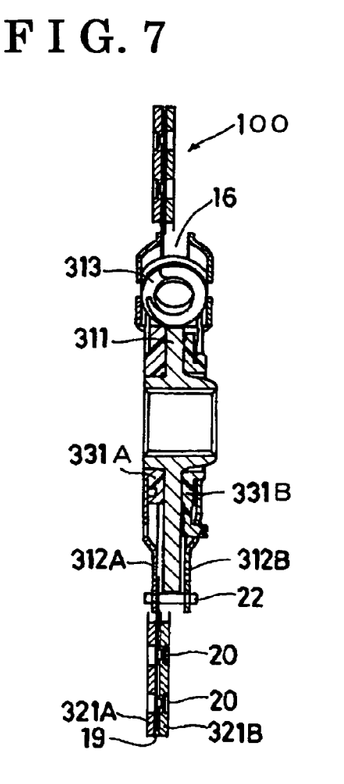
FIG. 7 is a cross-sectional view of the clutch disc taken on line VII-VII according to the second embodiment of the present invention.
Figure 8:
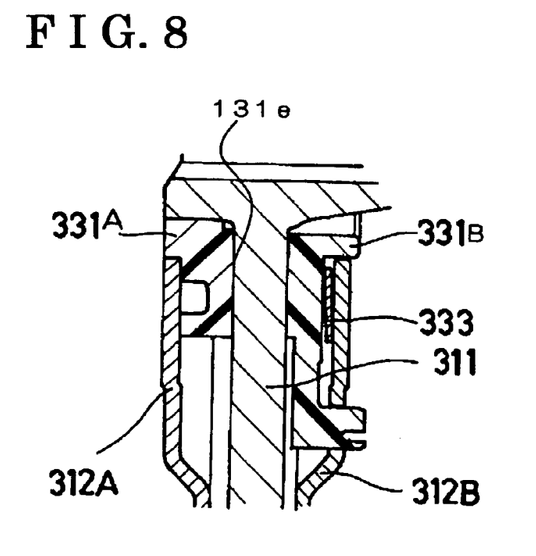
FIG. 8 is an enlarged cross-sectional view of a hysteresis mechanism of the clutch disc according to the second embodiment of the present invention.

A second embodiment of the present invention will be explained with reference to FIGS. 6-8 as follows. According to the second embodiment of the present invention, the inner hub 11 and the outer hub 110 of the clutch disc 1 of the first embodiment are integrated, the inner thrust member 31A and the outer thrust member 32A of the first embodiment are integrated, the inner thrust member 31B and the outer thrust member 32B of the first embodiment are integrated, and the inner coned disc spring 33 and the outer coned disc spring 34 of the first embodiment are integrated. Explanations for constructions of the second embodiment of the present invention identical to the first embodiment of the present invention are not repeated.

A clutch disc 100 according to the second embodiment of the present invention includes a hub 311 engaged with an input shaft of a transmission of a driven shaft by means of splines, a first side plate 312A provided at a first side of the hub 311 coaxially and to be relatively rotatable, a second side plate 312B provided at a second side of the hub 311 coaxially and to be relatively rotatable, four coil springs 313 (i.e., serving as a spring) elastically connecting the hub 311 and the first side plate 312A and the second side plate 312B in a circumferential direction, a pair of spring sheets 14A, 14B supporting each of the coil springs 13 relative to the hub 11, and the first and second slide plates 12A, 12B, a first thrust member 331A provided between the hub 311 and the first side plate 312A, a second thrust member 331B provided between the hub 311 and the second side late 312B, and a coned disc spring 333 which biases the second thrust member 331B towards the hub 311.

The first side plate 312A and the second side plate 312B are fixed onto each other keeping a predetermined distance from each other by means of rivets 322, and are configured to integrally rotate. Further, a ring shape cushioning plate 319 which has waviness on surface in a thickness direction is fixed on the external periphery portion of the first side plate 312A by means of the rivets 322. Friction members 312A, 312B are fixed on either side of the cushioning plate 319 by means of the rivets 320. The friction members 312A, 312B are positioned between a flywheel fixed on a crankshaft of an engine and a pressure plate of a clutch cover fixed on the flywheel by means of bolts. By thrusting the friction members 321A, 321B to the pressure plate to frictionally engage the flywheel with the pressure plate, the rotational torque of the engine is inputted into the first side plate 312A.

The coil springs 313 are positioned in accommodation windows 316 provided at the first side plate 312A and the second side plate 312B. The accommodation windows 316 are formed at the hub 311 by recessing an external periphery portion of the hub 311 in a radial outward direction, and an external periphery surface side of a sheet portion of the spring sheet 14A, 14B is positioned at outward in a radial direction compared to the external periphery surface of the hub 311. Accordingly, the coil springs 313 can be positioned at as far external peripheral side as possible, the size of the coil springs which can be applied to the clutch disc can be increased, and thus the clutch disc can cope with the greater level of the torque fluctuation. Accommodation windows 17 formed on the side plates 312A, 312B are window bores punched at the external periphery side of the coil springs 313, and are provided at positions which oppose the accommodation windows 16 of the hub 311 relative to the rotational axis. Each of the coil springs 13, while being supported by a pair of the spring sheets 14A, 14B, is accommodated in the accommodation windows 16 and 17 formed by the first side plate 312A, the second side plate 312B, and the hub 311. The accommodation window 17 formed on the side plates 312A, 312B are formed as a semi-chambered condition by punching, and pinches and supports both ends of the sheet portions of the spring sheets 14A, 14B. A concave portion is formed at an central position of the sheet portion of the spring sheets 14A, 14B, and a convex portion formed on the hub 311 is fitted into the concave portion, and thus the spring sheets 14A, 14B are supported by the hub 311. In other words, the coil springs 313 are supported by the side plates 312A, 312B and the hub 311 through the spring sheets 14A, 14B, and the coil springs 13 are deformed upon the rotation of the side plates 312A, 312B, and the restoring force of the coil springs 313 rotates the hub 311. In reverse, upon the rotation of the hub 311, the coil springs 313 are deformed, and the restoring force of the coil spring 313 rotates the side plates 312A, 312B.

Operations of the hub 311 and the first and second side plates 312A, 312B of the clutch disc 100 according to the second embodiment of the present invention is identical to the operation of the outer hub 110, and the first and second side plate 12A, 12B of the first embodiment of the present invention, and thus the explanation is not repeated.

According to the embodiment of the present invention, the opposing surface of the thrust member is tapered, and the external periphery portion or the internal periphery portion of the opposing surface contacts the hub to generate the hysteresis. With this construction, compared to a case where the opposing surface has a plane surface to contact the hub, substantial dimension of the opposing surface which contacts the hub is reduced, the influence of the waviness surface and warping can be reduced, the pressure applied to the opposing surface which contacts the hub is substantially increased, and thus the thrust member stably contacts the hub.

According to the embodiment of the present invention, because either the external periphery portion or the internal periphery portion of the opposing surface uniformly contacts the hub, the clutch disc can have stable hysteresis properties without being dispersed when the clutch disc is initially assembled.

According to the embodiment of the present invention, because the external periphery of the opposing surface contacts the hub, radius that contacts the hub can be set longer, and thus relatively large degree of hysteresis properties can be generated even when the thrust member is reduced in size. Further, because radius that contacts the hub can be set longer, the biasing means (i.e., coned disc spring) for biasing the thrust member can be reduced in size, and thickness of the side plate which supports the coned disc spring can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A clutch disc comprising:
  a hub having a flange portion extended in a radial direction and a boss portion;
  a side plate arranged coaxially with and relatively rotatable with the hub;
  a friction member connected to an external periphery of the side plate;
  an accommodation window formed on an external periphery portion of the hub and on the side plate, the accommodation window on the hub and the accommodation window on the side plate being positioned facing each other in a rotational axial direction;
  a plurality of springs elastically connecting the hub to the side plate in a rotational direction in the accommodation window;
  a thrust member provided in a space in an axial direction between the hub and the side plate; wherein
  the thrust member includes a ring shape member which is biased towards the flange portion of the hub by a biasing means; and wherein
  said thrust member having a tapered end surface, and only a radially outer portion of the tapered end surface contacts the hub.

2. The clutch disc according to claim 1, wherein the hub of the clutch disc comprises:
  an inner hub having the flange portion extended in the radial direction and the boss portion;
  an outer hub shaped in a ring provided at an external periphery of the inner hub and arranged coaxially with and relatively rotatable to the inner hub;
  a recess portion formed at an external periphery of the inner hub and at an internal periphery of the outer hub, the recess portion on the inner hub and the recess portion on the outer hub being positioned facing each other;
  the clutch disc comprises:
  a plurality of sub-coil springs elastically connecting the inner hub to the outer hub in a rotational direction in the recess portion;
  the side plate arranged coaxially with and relatively rotatable to the inner hub and the outer hub;

the accommodation window formed at an external periphery of the outer hub and the side plate, the accommodation window on the outer hub and the accommodation window on the side plate being positioned facing each other in a rotational axis direction;

the thrust member including an inner thrust member and an outer thrust member positioned in a space in an axial direction between the side plate and the inner hub and the outer hub; wherein the inner thrust member and the outer thrust member are members shaped in a ring which are configured to be biased towards the flange portion of the inner hub and towards the outer hub by the biasing means respectively, and the opposing surfaces facing the flange portion of the inner hub and the outer hub are tapered.

3. The clutch disc according to claim 2, wherein the opposing surfaces of the inner thrust member and the outer thrust member are tapered, and external periphery sides of the inner thrust member and the outer thrust member configured to contact the flange portion of the inner hub and the outer hub respectively.

4. The clutch disc according to claim 3, wherein a degree of tapering of the inner thrust member is defined by a difference between a thickness of an external periphery portion and a thickness of an internal periphery portion, a degree of tapering of the outer thrust member is defined by a difference between a thickness of an external periphery portion and a thickness of an internal periphery portion; and the degree of tapering of the inner thrust member and the degree of the tapering of the outer thrust member is set at difference values.

5. The clutch disc according to claim 1, wherein the thrust member is formed by injection molding with resin material.

6. The clutch disc according to claim 2, wherein the inner thrust member and the outer thrust member are formed by injection molding with resin material.

7. The clutch disc according to claim 3, wherein the inner thrust member and the outer thrust member are formed by injection molding with resin material.

8. The clutch disc according to claim 4, wherein the inner thrust member and the outer thrust member are formed by injection molding with resin material.

* * * * *